Sept. 25, 1923.
G. W. MITCHELL
CHICK FEEDING DEVICE
Filed Aug. 10, 1922
1,468,668
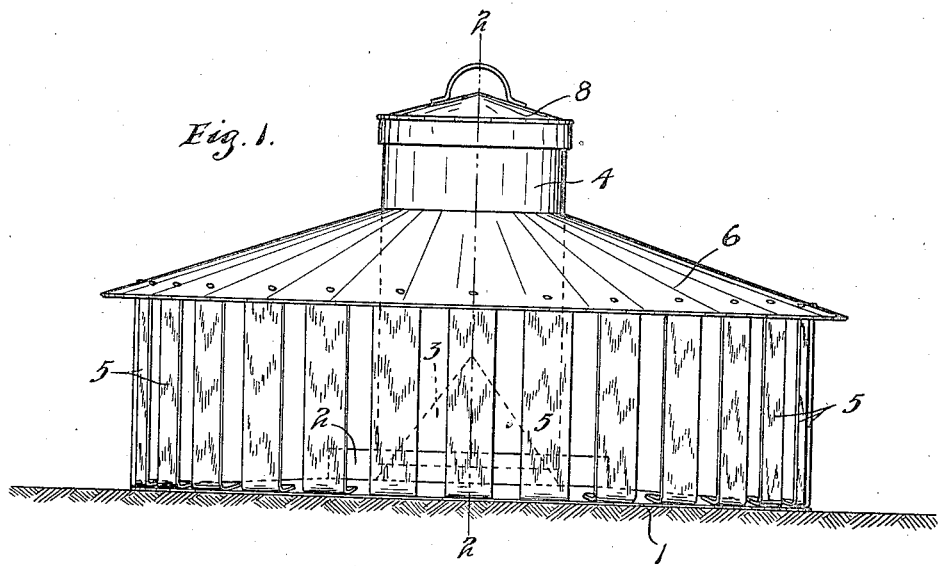
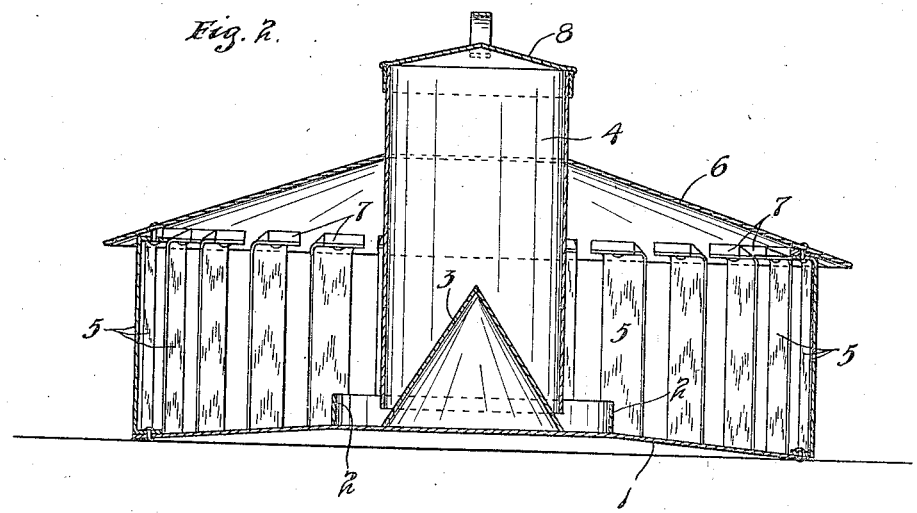
INVENTOR.
GEORGE W. MITCHELL
BY HIS ATTORNEY.
James F. Williamson Patented Sept. 25, 1923.

1,468,668

UNITED STATES PATENT OFFICE.

GEORGE W. MITCHELL, OF LE ROY TOWNSHIP, MOWER COUNTY, MINNESOTA.

CHICK-FEEDING DEVICE.

Application filed August 10, 1922. Serial No. 580,896.

*To all whom it may concern:*

Be it known that I, GEORGE W. MITCHELL, a citizen of the United States, residing at the township of Le Roy, in the county of Mower and State of Minnesota, have invented certain new and useful Improvements in Chick-Feeding Devices; and I do hereby declare the following to be a full, clear, and exact description of the invention, such as will enable others skilled in the art to which it appertains to make and use the same.

This invention relates to stock feeders and particularly to a device adapted for feeding chicks or other young poultry. When the poultry is fed the small young chicks are prevented from getting their share of feed by the activity of the adult poultry, and furthermore, it is very desirable to feed the young chicks or poultry separate from the adult poultry so as to prevent injury to the former.

It is an object of the present invention, therefore, to provide a simple and efficient poultry feeding device provided with means for preventing the entrance of the adult poultry to the feed-holding means or to the feeding floor.

It is another object of the invention to provide such a device having the above stated means comprising spaced vertical members which can be easily and quickly adjusted to vary the distance therebetween.

It is still another object of the invention to provide a simple covered device for feeding the young poultry so constructed that any water or moisture will be readily drained therefrom to keep the same in dry and sanitary condition.

These and other objects and advantages of the invention will fully appear from the following description made in connection with the accompanying drawings in which like references characters refer to the same parts throughout the several views, and in which, Fig. 1 is a view in side elevation of the device; and Fig. 2 is a vertical section taken on the line 2—2 of Fig. 1.

Referring to the drawings, the device comprises a floor or bottom member 1 illustrated as of circular shape, and which floor is formed to incline downwardly toward its outer edge. The member 1 has an annular upstanding flange 2 formed substantially centrally thereof, which flange surrounds and axially alines an upstanding cone member 3. A feed containing member 4 is provided shown as of cylindrical form, the lower edge of which terminates in a line spaced from and slightly below the top of the flange 2 and also spaced laterally from the surface of the cone member 3. The member 1 has extending vertically therefrom adjacent its outer edge spaced members 5 comprising slats of considerable width having their lower ends bent inwardly at substantially a right angle and pivotally secured to the member 1 by rivets. These members have their upper ends also bent inwardly substantially at a right angle and are pivotally connected by a vertical pivot alined with the lower pivots to a downwardly projecting frusto-conical cover member 6 which is secured at its upper edge to the surface of the cylindrical member 4 at a point some distance below the top of the latter. Spacing members 7 comprising small wedge-shaped pieces may be inserted between the tops of the slats 5 and the member 6. The slats 5 are thus each pivotally connected, for turning movement on a vertical axis. The cylinder member 4 is provided at its upper end with a lid 8 having a suitable bail handle member thereon. The member 4 is supported by the member 6 and the latter member is supported by the spaced circumferentially disposed members 5.

In operation, the food for the poultry will be placed in the member 4 and will drop down in contact with the cone member 3. Some of the feed will, of course, pass out beyond the lower edge of the member 4 against the wall of the flange 2 and will here be accessible to the poultry. The young chicks or other poultry can enter between the slats 5 and will thus have ready access to the feed. The older or adult chickens or other poultry will be prevented from entering the feeding floor or bottom member 1 by the slats 5 and they can thus not interfere with the small chicks feeding at the distributor formed by the members 2, 3 and 4. It is often desirable to regulate the size of the openings between the slats 5 to admit poultry of different sizes and this can readily be done by merely turning the slats 5 on their vertical pivots. When the slats stand substantially normal to the radii of the device the spaces will be smallest and when the said slats are turned into substantially radial planes, the spaces will be largest. The slats are secured so as to have sufficient friction to hold the same in any position into which they may be turned. The desired variation of the openings for the admission of the proper sized poultry is thus readily effected.

It will be noted that the cover 6 will effectively shed the rain and moisture from the feeding floor 1 as well as the feed holding and distributing parts, and furthermore, any water or moisture will be quickly drained from the floor 1 owing to its slightly inclined contour.

From the above description it is seen that applicant has provided a very simple and efficient feeding device for poultry or other stock. The device is preferably constructed from non-corrodible sheet metal and can be easily and inexpensively made.

It will, of course, be understood that various changes may be made in the form, details and arrangement of the parts without departing from the scope of applicant's invention, which, generally stated, consists in the matter shown and described and set forth in the appended claims.

What is claimed is:

1. A poultry feeding device having in combination, a bottom member forming a floor for the poultry and accessible to the poultry from all sides having a central substantially horizontal portion and sloping away from said portion toward its outer edge, a feeding trough supported on said horizontal portion and accessible to the poultry on said floor from all sides, a vertically disposed fixed container extending upwardly from said trough, and a cover member spaced above said bottom member and sloping outwardly and downwardly from said container to a point slightly beyond the edge of said bottom member, and spaced means extending between the cover and bottom member and adjustable to vary the spaces therebetween whereby poultry of a certain size may be excluded.

2. The structure set forth in claim 1, said means comprising flat guard members extending between said cover and bottom member and pivoted to swing on vertical axes whereby they can be turned various degrees to vary the openings therebetween.

3. The structure set forth in claim 2, said flat members being in the form of slats having their ends inturned substantially at right angles and pivoted, respectively, to the bottom member and to the cover member adjacent the edges thereof and on alined vertical pivots.

4. A poultry feeding device having in combination, a circular disk adapted to form a floor for the poultry having a substantially horizontal central portion and sloping away from said portion toward its outer edge, a circular feeding trough supported on said horizontal portion, a cone rising vertically from said horizontal portion in said trough, a cylindrical container having an open lower end rising from said trough and having its lower end extending over and spaced slightly from said cone, a cover member of frusto-conical shape extending from the walls of said container outwardly and downwardly to a point slightly beyond the edge of said bottom member, spaced vertical slats extending between said cover and bottom member and pivoted thereto about vertical axes whereby said slats can be swung on said axes and the space therebetween varied.

In testimony whereof I affix my signature.

GEORGE W. MITCHELL.